United States Patent
Fukushima et al.

(10) Patent No.: US 10,280,860 B2
(45) Date of Patent: *May 7, 2019

(54) AIR/FUEL RATIO CONTROL APPARATUS FOR GENERAL-PURPOSE ENGINE

(75) Inventors: Tomoki Fukushima, Wako (JP); Tadayuki Yoneyama, Wako (JP); Hayato Matsuda, Wako (JP); Takashi Hashizume, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 1166 days.

This patent is subject to a terminal disclaimer.

(21) Appl. No.: 12/978,885

(22) Filed: Dec. 27, 2010

(65) Prior Publication Data

US 2011/0202259 A1    Aug. 18, 2011

(30) Foreign Application Priority Data

Feb. 12, 2010   (JP) ................................ 2010-029034

(51) Int. Cl.
  *F02M 43/00*    (2006.01)
  *G06F 17/00*    (2006.01)
  (Continued)

(52) U.S. Cl.
  CPC ....... *F02D 41/1458* (2013.01); *F02D 19/061* (2013.01); *F02D 19/0613* (2013.01);
  (Continued)

(58) Field of Classification Search
  CPC ............... F02D 19/081; F02D 19/0655; F02D 41/0052; F02D 41/182; F02D 41/1458;
  (Continued)

(56) References Cited

U.S. PATENT DOCUMENTS

| | | | |
|---|---|---|---|
| 1,409,736 A * | 3/1922 | Lea ........................ | F02N 19/10 123/142.5 E |
| 2,919,384 A | 2/1959 | Guarino et al. | |

(Continued)

FOREIGN PATENT DOCUMENTS

| | | | | |
|---|---|---|---|---|
| DE | 4121723 A1 * | 1/1993 | ........... | F02D 31/002 |
| DE | 4121723 A1 * | 1/1993 | ........... | F02D 31/002 |

(Continued)

OTHER PUBLICATIONS

Japanese Office Action dated Jul. 24, 2013, and English translation thereof, issued in Japanese Patent Application No. 2010-029034.

*Primary Examiner* — Lindsay M Low
*Assistant Examiner* — Josh Campbell
(74) *Attorney, Agent, or Firm* — Westerman, Hattori, Daniels & Adrian, LLP

(57) ABSTRACT

In an apparatus for controlling an air/fuel ratio of a general-purpose internal combustion engine using mixed fuel containing alcohol and gasoline and operated at a desired engine speed inputted by the operator while a throttle opening is regulated such that a detected engine speed converges to the inputted desired engine speed, a fuel injection amount determined for mixed fuel based on fuel injection amount characteristics is increased/decreased when a load is kept constant and the output air/fuel ratio is estimated to correct the fuel injection amount by the estimated air/fuel ratio, while a switch (knob) is installed to be manipulated by the operator to switch the fuel injection amount characteristics.

20 Claims, 10 Drawing Sheets

(51) Int. Cl.
*F02D 41/14* (2006.01)
*F02D 19/06* (2006.01)
*F02D 19/08* (2006.01)
*F02D 41/00* (2006.01)
*F02D 41/18* (2006.01)

(52) U.S. Cl.
CPC ....... *F02D 19/0631* (2013.01); *F02D 19/084* (2013.01); *F02D 19/088* (2013.01); *F02D 41/0025* (2013.01); *F02D 19/0655* (2013.01); *F02D 19/081* (2013.01); *F02D 41/0035* (2013.01); *F02D 41/0052* (2013.01); *F02D 41/182* (2013.01); *F02D 2200/0404* (2013.01); *F02D 2200/604* (2013.01); *Y02T 10/36* (2013.01)

(58) Field of Classification Search
CPC .. F02D 19/0631; F02D 19/084; F02D 19/061; F02D 19/088; F02D 19/0613; F02D 41/0025; F02D 2200/0404; F02D 2200/604; Y02T 10/36
USPC .......................................... 701/104; 123/299
See application file for complete search history.

(56) References Cited

U.S. PATENT DOCUMENTS

| | | | | |
|---|---|---|---|---|
| 4,031,864 A * | 6/1977 | Crothers | ................ | F02B 1/02 123/1 A |
| 4,615,319 A | 10/1986 | Tomisawa | | |
| 5,255,655 A * | 10/1993 | Denz | ................ | F02D 41/045 123/479 |
| 5,507,265 A * | 4/1996 | Ichikawa | .............. | F02D 41/068 123/478 |
| 5,586,544 A * | 12/1996 | Kitamura | .............. | F02D 41/047 123/480 |
| 5,657,737 A * | 8/1997 | Ishida | ................ | F02D 41/047 123/674 |
| 5,832,896 A * | 11/1998 | Phipps | .................. | 123/352 |
| 5,944,766 A * | 8/1999 | White | ................ | B60K 31/047 180/179 |
| 6,668,804 B2 * | 12/2003 | Dobryden et al. | ............ | 123/480 |
| 6,880,524 B2 * | 4/2005 | Gates | ...................... | F02D 11/10 123/399 |
| 7,475,683 B2 * | 1/2009 | Kokubu | .............. | F02D 41/0025 123/436 |
| 2002/0157652 A1 * | 10/2002 | Hoshi | .................. | F02D 41/062 123/491 |
| 2007/0265760 A1 * | 11/2007 | Konhauser | ......... | B60K 31/0008 701/97 |
| 2008/0000457 A1 | 1/2008 | Matsushita et al. | | |
| 2008/0072878 A1 | 3/2008 | Kokubu | | |
| 2009/0292444 A1 * | 11/2009 | Russell | ........................ | 701/103 |
| 2010/0089363 A1 * | 4/2010 | Moriya | ................ | F02D 35/023 123/435 |
| 2010/0122695 A1 * | 5/2010 | Kunisada | ............. | F02D 41/0025 123/575 |
| 2010/0138135 A1 * | 6/2010 | Hacker | ............... | F02D 41/0085 701/102 |

FOREIGN PATENT DOCUMENTS

| | | | | |
|---|---|---|---|---|
| EP | 0066327 A1 * | 12/1982 | ............... | F01D 3/00 |
| JP | 63-005131 A | 1/1988 | | |
| JP | 6320239 A * | 1/1988 | | |
| JP | 06-288266 A | 10/1994 | | |
| JP | 2004-346819 A | 12/2004 | | |
| JP | 2007-303382 A | 11/2007 | | |
| JP | WO 2008108419 A1 * | 9/2008 | ........... | F02D 35/023 |
| JP | 2009-191628 A | 8/2009 | | |
| JP | 2009-191825 A | 8/2009 | | |
| JP | 2009-281208 A | 12/2009 | | |
| JP | 2010-19177 A | 1/2010 | | |
| JP | 2010019177 A * | 1/2010 | | |
| WO | WO 2008012626 A2 * | 1/2008 | | |
| WO | WO 2008108419 A1 * | 9/2008 | | |
| WO | WO 2008135312 A1 * | 11/2008 | ......... | F02D 41/0085 |

* cited by examiner

48

50

AIR/FUEL RATIO CONTROL APPARATUS FOR GENERAL-PURPOSE ENGINE

BACKGROUND OF THE INVENTION

Field of the Invention

This invention relates to an air/fuel ratio control apparatus for a general-purpose internal combustion engine, particularly to an air/fuel ratio control apparatus for a general-purpose engine using mixed fuel containing alcohol and gasoline.

Description of the Related Art

Conventionally, there is proposed a technique for an engine using mixed fuel containing alcohol and gasoline, which is configured to provide an air/fuel ratio sensor ($O_2$ sensor (oxygen sensor) or a wide-range air/fuel ratio sensor in the exhaust system to detect an air/fuel ratio to determine a deviation from a predetermined value caused due to the mixed alcohol, estimate a rate of the alcohol in the fuel based on the detected deviation of the air/fuel ratio, and determine a fuel injection amount based on one from among sets of characteristics (maps; mapped data) selected from the estimated alcohol rate (or correct the fuel injection amount by the estimated alcohol rate), thereby controlling a fuel injection amount, as taught, for example, in Japanese Laid-Open Patent Application No. Sho 63 (1988)-5131.

SUMMARY OF THE INVENTION

However, in the reference, it is after the engine start that the deviation of the air/fuel ratio is detected and based on the estimated alcohol rate, one from among sets of the fuel injection amount characteristics is selected to control the fuel injection. Accordingly, if the engine is not started, an appropriate one from among sets of fuel injection amount characteristics corresponding to the alcohol rate can not naturally be selected.

As a result, when, for example, the alcohol rate is high, since the appropriate set of fuel injection amount characteristics is not selected appropriately before the engine start, the engine can not be properly started.

Further, as to an engine mounted on a generator or snowplow, if an appropriate one from among sets of fuel injection amount characteristics is not selected in response to a temperature and altitude of a place of use, the engine can not also be started.

An object of this invention is therefore to overcome the foregoing problem by providing an air/fuel ratio control apparatus for a general-purpose engine that can select an appropriate one from among sets of fuel injection amount characteristics such that the engine can be properly started in various environments.

In order to achieve the object, this invention provides in its first aspect an apparatus for controlling an air/fuel ratio of a general-purpose internal combustion engine that is connectable to a load, having a desired engine speed input switch adapted for an operator to input a desired speed of the engine, an engine speed detector that detects a speed of the engine, a throttle opening regulator that regulates an opening of a throttle valve installed in an air intake pipe of the engine such that the detected engine speed converges to the inputted desired engine speed, a fuel injection amount calculator that calculates a fuel injection amount of the engine based on the detected engine speed and the regulated throttle opening in accordance with one from among sets of fuel injection amount characteristics, and an injector that injects fuel based on the calculated fuel injection amount, wherein the improvement comprises: a switch enabled to be manipulated by the operator to switch the sets of the fuel injection amount characteristics from the one to another.

In order to achieve the object, this invention provides in its second aspect a method for controlling an air/fuel ratio of a general-purpose internal combustion engine that is connectable to a load, having a desired engine speed input switch adapted for an operator to input a desired speed of the engine, an engine speed detector that detects a speed of the engine, a throttle opening regulator that regulates an opening of a throttle valve installed in an air intake pipe of the engine such that the detected engine speed converges to the inputted desired engine speed, a fuel injection amount calculator that calculates a fuel injection amount of the engine based on the detected engine speed and the regulated throttle opening in accordance with fuel injection amount characteristics, and an injector that injects fuel based on the calculated fuel injection amount, wherein the improvement comprises the steps of: enabling by the operator to switch the sets of the fuel injection amount characteristics from the one to another.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

An air/fuel ratio control apparatus for a general-purpose engine according to embodiments of the present invention will now be explained with reference to the attached drawings.

Figure 1:
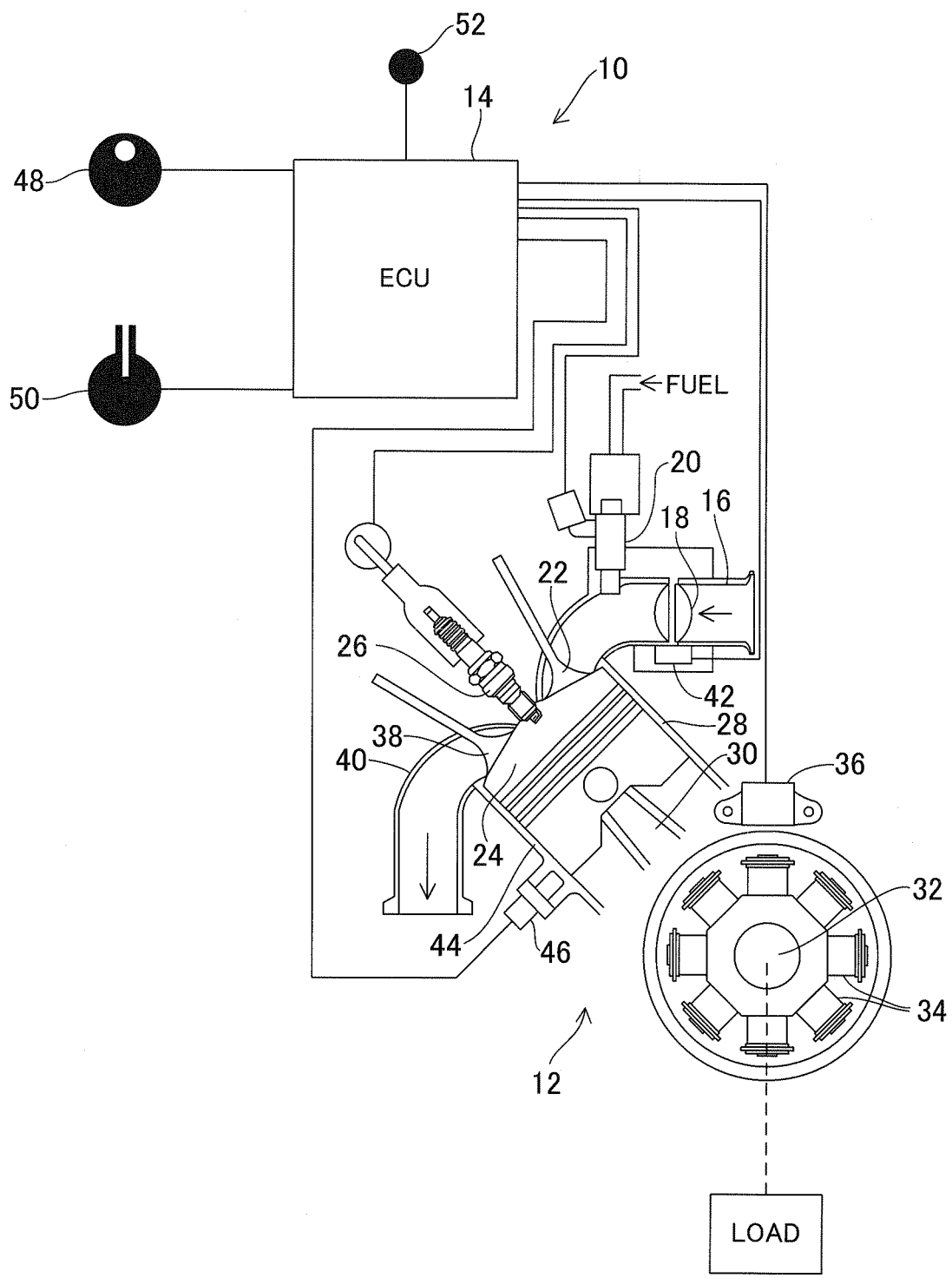
FIG. 1 is an overall schematic view showing an air/fuel ratio control apparatus for a general-purpose engine according to a first embodiment of this invention.

FIG. 1 is an overall schematic view showing an air/fuel ratio control apparatus for a general-purpose engine according to a first embodiment of this invention.

In FIG. 1, symbol 10 designates the air/fuel ratio control apparatus for a general-purpose engine 12 (shown in cross-section) 12. The apparatus 10 has an Electronic Control Unit (ECU) 14 for electronically controlling the engine 12. The ECU 14 comprises a microcomputer having a CPU, memory (EEPROM or non-volatile memory) and other components.

The engine 12 is a single-cylinder, four-cycle, air-cooled, OHV engine with a displacement of, for example, 440 cc, and is a general-purpose engine to be mounted on a machine such as a generator, lawnmower and snowplow which functions as a load when connected to the engine 12.

An air intake pipe 16 of the engine 12 is installed with a throttle valve 18 and injector 20. Intake air sucked in and flowing in the air intake pipe 16 is regulated through the throttle valve 18 and fuel injected from the injector 20 are mixed thereto. The thus-generated air-fuel mixture is drawn into a combustion chamber 24 when an intake valve 22 is opened and burned or exploded upon being ignited by a spark plug 26, thereby driving a piston 28. The driven piston 28 rotates a crankshaft 32 through a connecting rod 30. The crankshaft 32 is connected to the machine (load), and its rotation is transmitted to the load.

The crankshaft 32 is provided along its circumference with a plurality of (i.e., eight) pulsar coils 34 and when the crankshaft 32 is rotated, a pulsar coil detector 36 installed at a position close to the outer periphery of the pulsar coils 34 produces an output or signal (crank angle signal Pc) indicative of a position of the piston 28. The burned air-fuel mixture is discharged to an exhaust pipe 40 when an exhaust valve 38 is opened.

An electric motor (more precisely, a stepper motor; referred to as "throttle motor") 42 is connected to the throttle valve 18. Specifically, the throttle motor 42 is connected to a rotary shaft of the throttle valve 18 through a speed reducer. The throttle motor 42 is operated to regulate an opening of the throttle valve 18, i.e., a throttle opening.

The injector 20 is supplied with fuel stored in the fuel tank and pressurized by a fuel supply device including a fuel pump. The fuel is mixed fuel containing alcohol (i.e., ethanol) and gasoline.

A temperature sensor 46 is installed near a cylinder 44 and produces a signal indicating a temperature of the engine 12. The aforementioned injector 20, spark plug 26, pulsar coil detector 36, throttle motor 42 and temperature sensor 46 are electrically connected to the ECU 14.

The ECU 14 is connected with a desired engine speed input knob (switch) 48 to be manipulated by the operator to input a desired speed of the engine 12, a map switching knob (switch) 50 enabled to be manipulated by the operator to switch one from among sets of fuel injection amount maps (mapped data; characteristics) to another, and an indicator 52. The indicator 52 comprises a lamp including an LED (Light-Emitting Diode) or the like and located to be visible to the operator.

Figure 2:
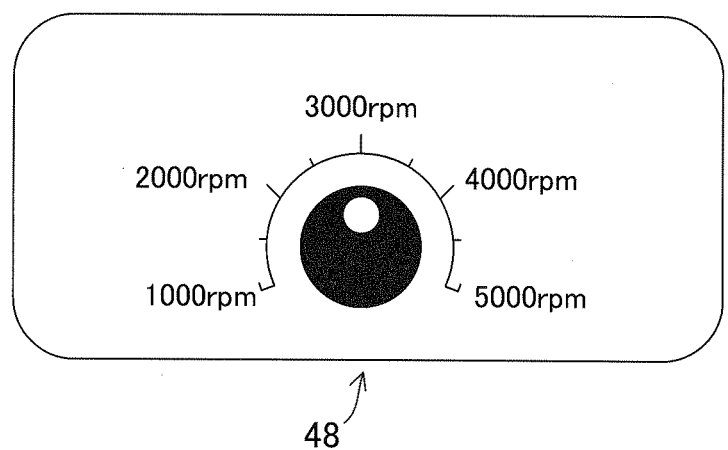
FIG. 2 is a view showing details of a desired engine speed input knob shown in FIG. 1.
Figure 3:
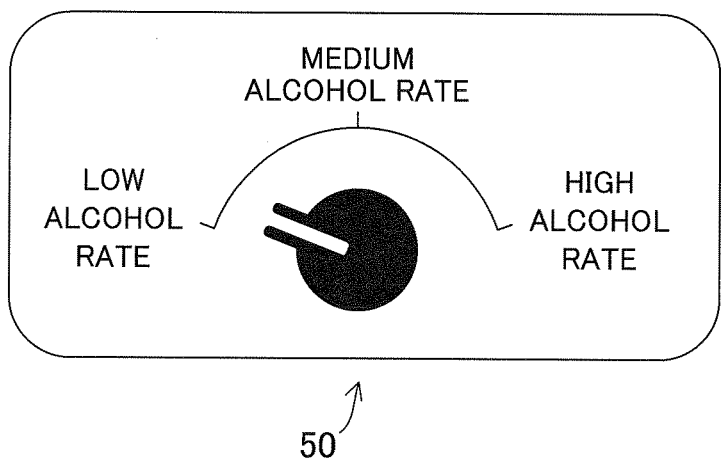
FIG. 3 is a view showing details of a map switching knob shown in FIG. 1.

FIG. 2 is a view showing details of the desired engine speed input knob 48 and FIG. 3 is a view showing details of the map switching knob 50.

The desired engine speed input knob 48 is made turnable (adjustable) continuously within a scale range between 1000 rpm and 5000 rpm. The map switching knob 50 is also made turnable to switch to select one from among maps (sets of characteristics) defining the fuel injection amounts) corresponding to low, medium and high alcohol rates. The low alcohol rate represents a rate of about 25%, the medium alcohol rate a rate of about 50%, and the high alcohol rate a rate of about 75%, for instance.

The knobs 48 and 50 are installed to be pinched with operator's fingers and manipulated by the operator. The operator manipulates (turns) the map switching knob 50 to a position corresponding to an assumed (estimated) alcohol rate of the mixed fuel stored in the fuel tank.

Based on the detection signals of the pulsar coil detector 36 and temperature sensor 46 and the input signals of the desired engine speed input knob 48 and map switching knob 50, the ECU 14 controls the fuel injection through the injector 20, the ignition timing through the spark plug 26, the throttle opening through the throttle motor 42. Further it controls turning on/off of the indicator 52.

Figure 4:
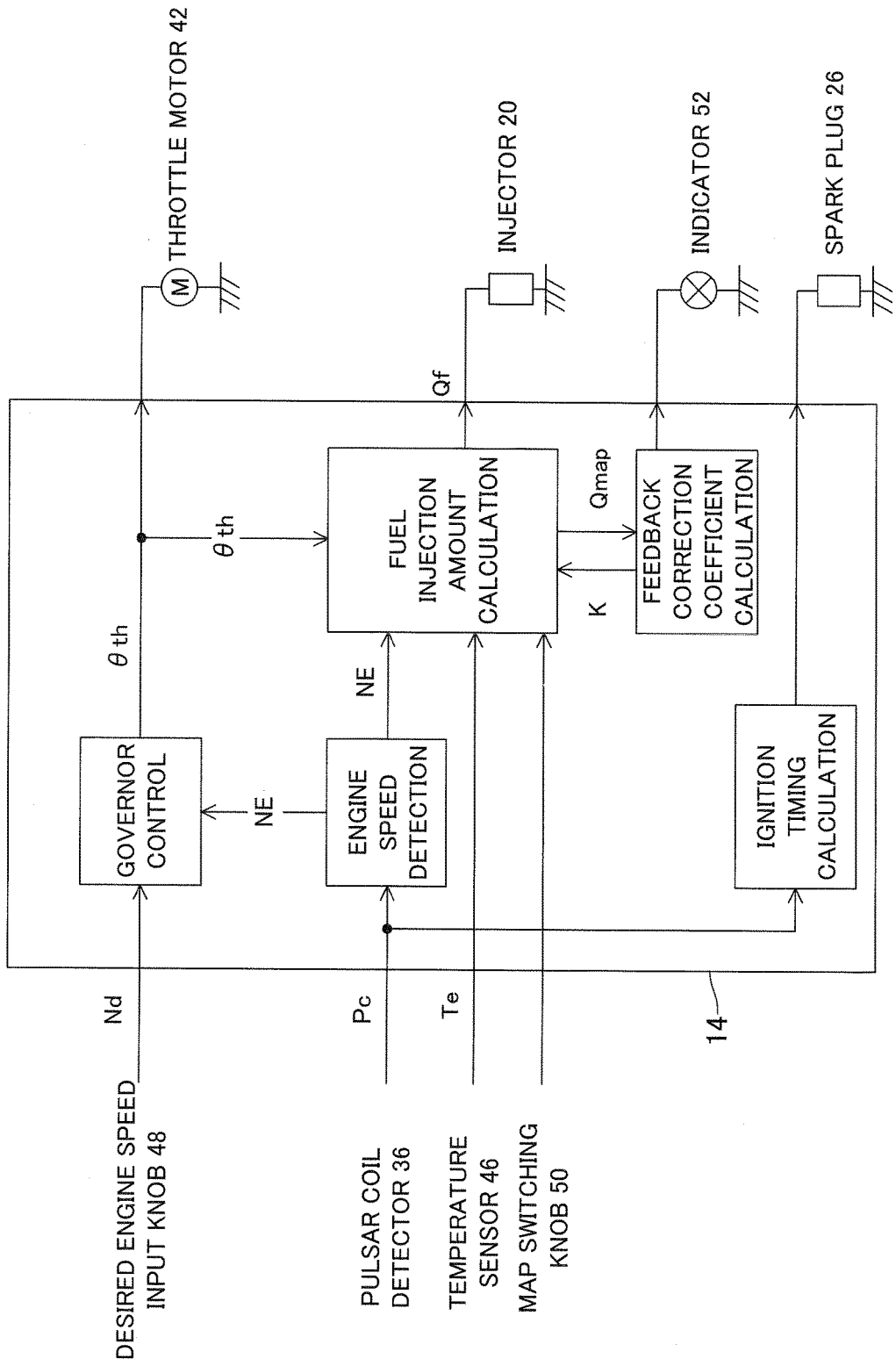
FIG. 4 is a block diagram showing operation of an electronic control unit (ECU) shown in FIG. 1 in a functional manner.

FIG. 4 is a block diagram showing the operation of the ECU 14 in a functional manner. As illustrated, the ECU 14 has an engine speed detection block (engine speed detector), a governor control block (throttle opening regulator), a fuel injection amount calculation block (fuel injection amount calculator), a feedback correction coefficient calculation block and an ignition timing calculation block.

The engine speed detection block counts a time interval between successive ones of the crank angle signal Pc detected by the pulsar coil detector 36 to detect the engine speed NE (rpm).

The governor control block is inputted with the desired speed Nd of the engine 12 inputted through the desired engine speed input knob 48 and the engine speed NE detected in the engine speed detection block, and controls the throttle opening such that the detected engine speed NE converges at the desired engine speed Nd.

Specifically, when the detected engine speed NE is lower than the desired engine speed Nd, it calculates a throttle opening command value θth to increase the throttle opening using PID control laws and outputs the same to the throttle motor 42 via the drive circuit (not shown). In contrast, when the engine speed NE is higher than the desired engine speed Nd, it calculates the throttle opening command value θth to decrease the throttle opening using the PID control laws and outputs the same to the throttle motor 42

The fuel injection amount calculation block calculates a fuel injection amount Qmap by retrieving one from among three maps (three sets of characteristics) experimentally prepared beforehand for the mixed fuel of the low, medium and high (i.e., 25, 50 and 75%) alcohol rates by the engine speed NE (detected in the engine speed detection block) and the throttle opening command value θth (indicative of the engine load outputted from the governor control block). In each of the three maps, the fuel injection amount Qmap is experimentally prepared beforehand under ideal conditions (i.e., ambient temperature: 25° C., altitude: 0 meter, humidity: 50%).

The fuel injection amount calculation block is inputted with a signal indicating a position (i.e., designated alcohol rate) from the map switching knob 50 designated by the operator, so that one of the fuel injection amount maps corresponding to the designated position of the map switching knob 50 is selected and the fuel injection amount is calculated by retrieving the selected fuel injection amount map by the aforesaid parameters.

The fuel injection amount calculation block is also inputted with the engine temperature Te detected by the temperature sensor 46 and based on the engine temperature Te, corrects the fuel injection amount calculated in accordance with the fuel injection amount map at the engine start.

The feedback correction coefficient calculation block calculates a feedback correction coefficient K and operates the indicator 52 based on the calculated coefficient K. Specifically, the fuel injection amount Qmap calculated in the fuel injection amount calculation block is forwarded to the feedback correction coefficient calculation block. The feedback correction coefficient calculation block calculates the feedback correction coefficient K in the manner explained later. The feedback correction coefficient K is stored in the memory.

The calculated coefficient K is sent to the fuel injection amount calculation block, where the fuel injection amount map is corrected or rebuilt by multiplying each fuel injection amount in the map by the coefficient K.

Specifically, the fuel injection amount is again calculated in accordance with the corrected fuel injection amount map and the calculation result is outputted to the injector 20 as a final fuel injection amount command value Qf (or the fuel injection amount is simply corrected by the coefficient). Based on the sent value Qf, the injector 20 injects the fuel at the intake port.

The ignition timing calculation block calculates the ignition timing based on the crank angle signal Pc sent from the pulsar coil detector 36 and outputs the calculated ignition timing to the spark plug 26, via an ignition device (not shown).

Figure 5:
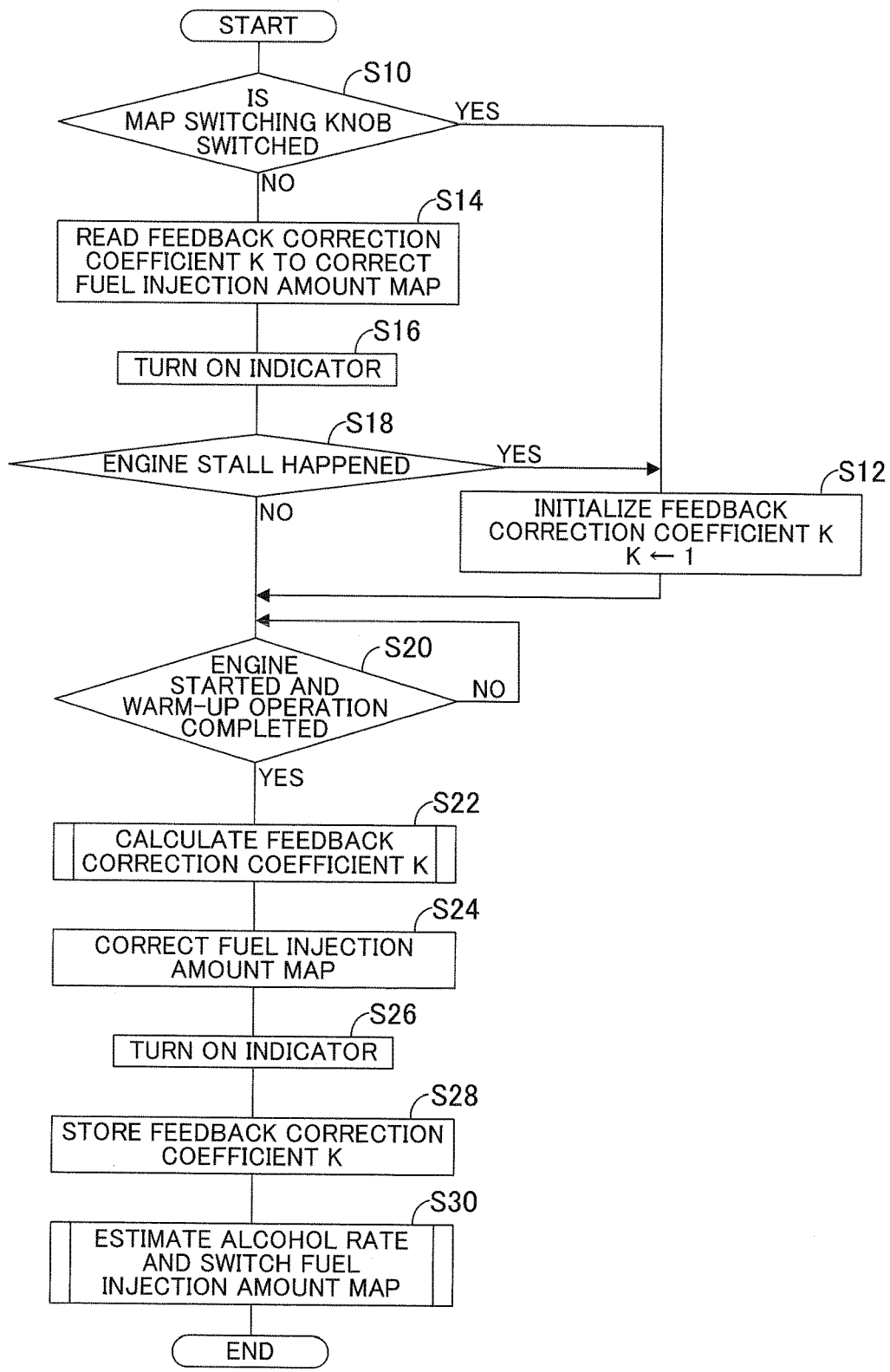
FIG. 5 is a flowchart showing the operation of the ECU shown in FIG. 4.

FIG. 5 is a flowchart showing the operation of the ECU 14, i.e., the apparatus 10. The illustrated program is executed by the ECU 14 when the operating power to the ECU 14 is being supplied by a starter motor (or recoil starter).

The program begins in S10, in which it is determined whether the map switching knob 50 was switched, i.e., whether it was changed from a designated position at the last engine stop to another position.

When the result in S10 is affirmative, the program proceeds to S12, in which the feedback correction coefficient K stored in the memory is initialized (explained later). Specifically, the coefficient K is set to 1.0.

When the result in S10 is negative, the program proceeds to S14, in which the coefficient K stored in the memory is read to correct or rebuild the fuel injection amount map. Specifically, the fuel injection amount map is corrected by multiplying the map values corresponding to the designated position of the map switching knob 50 by the coefficient K. Then the program proceeds to S16, in which the indicator 52 is turned on.

The program then proceeds to S18, in which it is determined whether the engine stall has happened. Specifically, when the engine 12 is started by the starter motor (or recoil starter), it is determined whether the engine 12 was stopped without reaching the self-rotational speed.

When the result in S18 is affirmative, since it means that the fuel injection amount is not appropriate, for example, by the reason that the fuel injection amount corrected by the coefficient K is not appropriate, the program proceeds to S12, in which the coefficient K is initialized. Also the indicator 52 is turned off.

When the result in S18 is negative, the program proceeds to S20, in which it is confirmed whether the engine 12 is started and warm-up operation after the engine start has been completed. The determination is made based on the output signal of the temperature sensor 46.

When it is confirmed that the warm-up operation has been completed, the program proceeds to S22, in which the feedback correction coefficient K is calculated.

Figure 6:
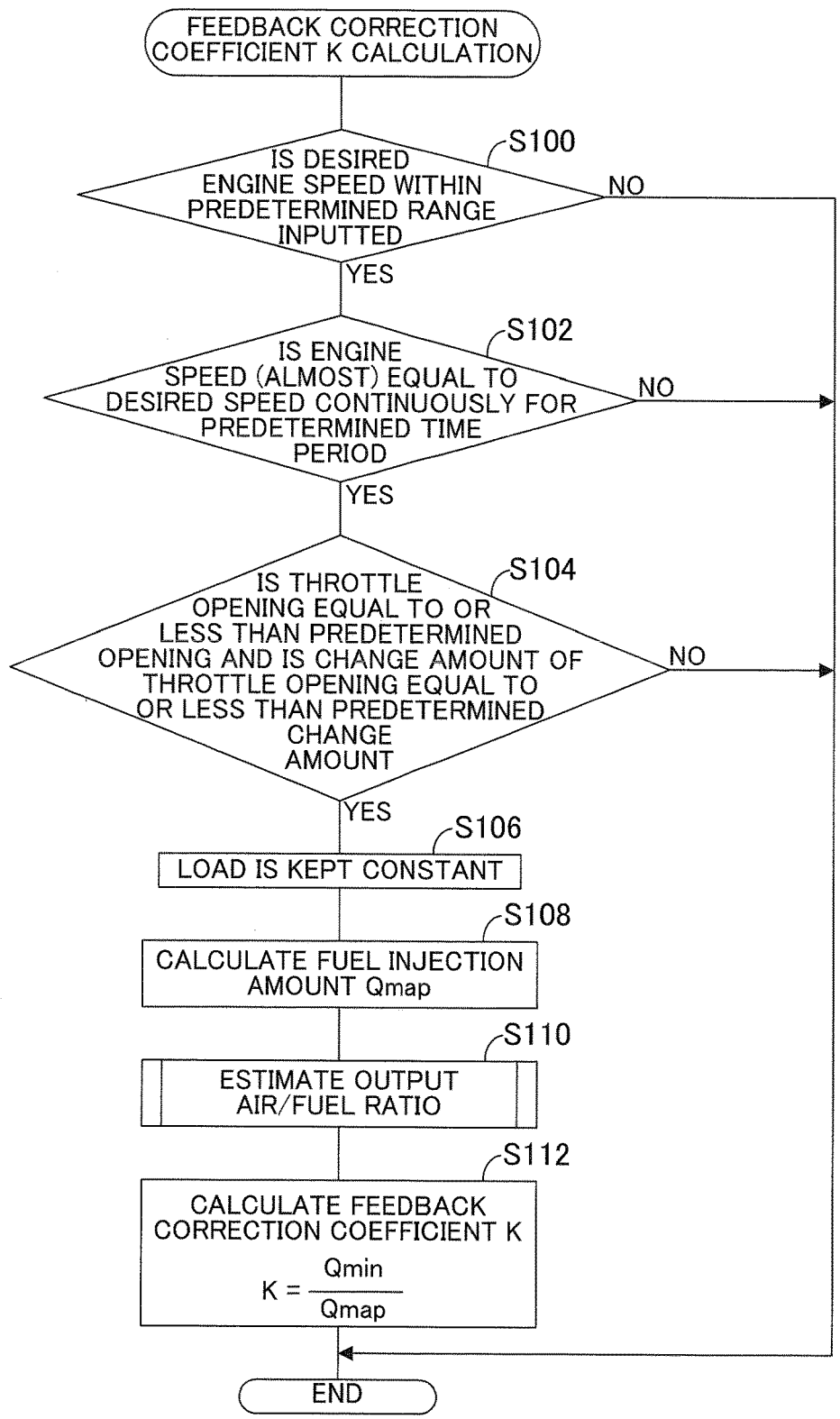
FIG. 6 is a subroutine flowchart showing calculation of a feedback correction coefficient referred to in the FIG. 5 flowchart.

FIG. 6 is a subroutine flowchart showing the process.

The program begins in S100, it is determined whether the desired engine speed Nd within a predetermined range is inputted, i.e., whether the desired engine speed input knob 48 is set within the range between 1000 rpm and 3000 rpm.

When the result in S100 is affirmative, the program proceeds to S102, in which it is determined whether the detected engine speed NE is equal to or almost equal to the desired engine speed Nd continuously for a predetermined time period, i.e., whether the engine speed NE remains within a range of plus and minus 200 rpm of the desired engine speed Nd consecutively for 5 seconds.

When the result in S102 is affirmative, the program proceeds to S104, in which it is determined whether the throttle opening (precisely, the throttle opening command value θth) is equal to or less than a predetermined throttle opening and a change amount of the throttle opening (precisely, the change amount of the throttle opening command value θth) is equal to or less than a predetermined change amount continuously for the predetermined time period.

To be specific, it is determined whether the throttle opening is equal to or less than an opening of 30% (when the full throttle opening is defined as 100%) and the change amount of the throttle opening remains within a range of plus and minus 1% for 5 seconds.

When the result in S104 is affirmative, the program proceeds to S106, in which it is determined that the load connected to the engine 12 is kept constant.

The program next proceeds to S108, in which the fuel injection amount Qmap is calculated. Specifically, the amount Qmap is calculated based on the engine speed NE and throttle opening command value θth detected under a condition where the load connected to the engine 12 is constant in accordance with the fuel injection amount map (which is the map whose values have not been corrected in S14). More specifically, the amount Qmap is calculated by retrieving one of the maps by the parameters.

Then the program proceeds to S110, in which an output air/fuel ratio is estimated.

Figure 7:
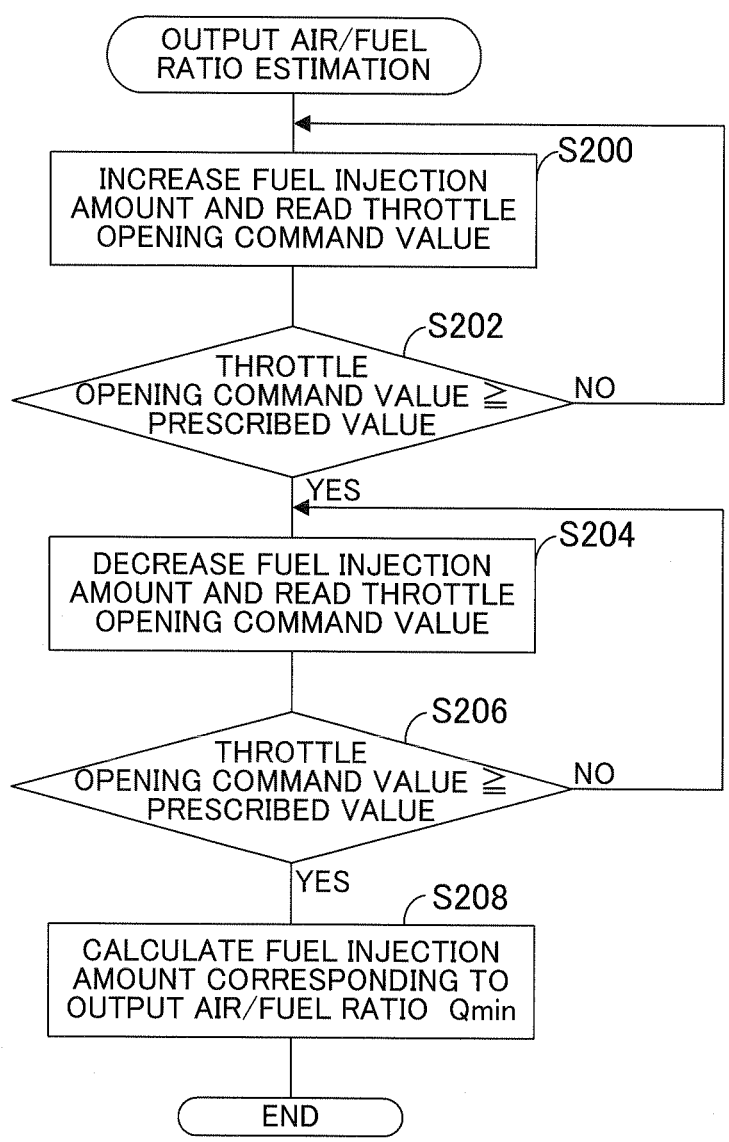
FIG. 7 is a subroutine flowchart showing estimation of an output air/fuel ratio referred to in the FIG. 6 flowchart.

FIG. 7 is a subroutine flowchart showing the process.

Before explaining this flowchart, a principle of the output air/fuel ratio estimation will be explained first.

Figure 8:
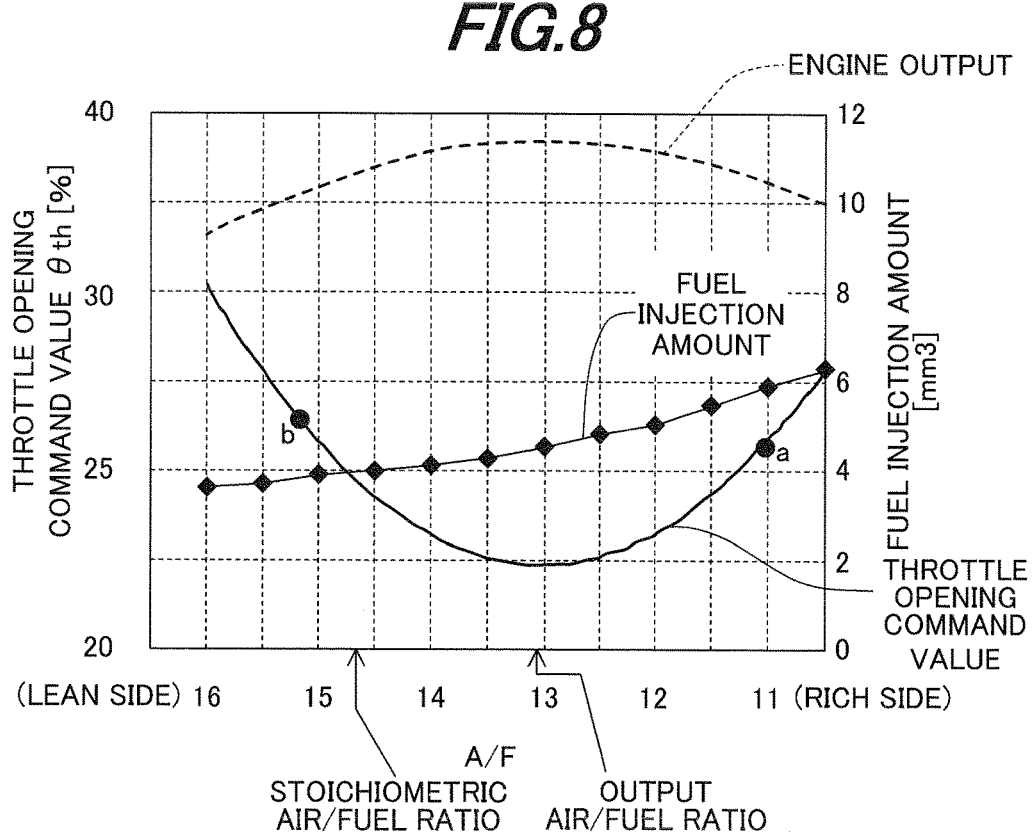
FIG. 8 is a graph showing a principle of the estimation of the output air/fuel ratio of FIG. 7.

FIG. 8 is a graph showing the principle. The abscissa indicates the air/fuel ratio A/F and a dashed line in the graph represents the output characteristics of the engine 12 relative to the air/fuel ratio A/F. Generally, the engine output becomes maximum at a specific air/fuel ratio (i.e., the so-called "output air/fuel ratio") on the richer side than the stoichiometric air/fuel ratio (A/F=14.7). In other words, the engine output decreases as the air/fuel ratio is changed to the leaner or richer side from the output air/fuel ratio.

When the load connected to the engine 12 is kept constant and the engine speed NE is the same as the desired engine speed Nd, the throttle opening command value θth is controlled to be constant. Under this condition, if the fuel injection amount is intentionally increased/decreased, i.e., the air/fuel ratio is changed, the engine output is changed accordingly so that the engine speed NE is also changed.

Consequently, it also changes the throttle opening command value θth. As illustrated in FIG. 8, the throttle opening (i.e., command value θth) becomes minimum at the point corresponding to the output air/fuel ratio, and increases in the richer or leaner air/fuel ratio direction.

Thus, under the condition where the load connected to the engine 12 is kept constant and the engine speed NE is kept the same as the desired engine speed Nd, the minimum value of the throttle value is determined when the fuel injection amount is intentionally increased or decreased, so that the output air/fuel ratio can be estimated.

The output air/fuel ratio estimation in the FIG. 7 flowchart is now explained.

The program begins n S200, in which the throttle opening command value θth is read, while the fuel injection amount is increased. Explaining this more concretely, the fuel injection amount is increased by 5% per second, and the throttle opening command value θth regulated with the increased fuel injection amount is read every 100 milliseconds to calculate an average of the throttle opening command values θth for 1 second. The increased fuel injection amounts (thus injected) and the averages of the throttle opening command values θth are sequentially stored in the memory.

The program then proceeds to S202, in which it is determined whether the throttle opening command value θth is increased by a prescribed value or more, i.e., whether the throttle opening command value θth (average) since the fuel injection amount increase is increased by 10% or more compared to that before the fuel injection amount increase. Explaining this in FIG. 8, it amounts to determining whether the value θth has reached a point a. When the result in S202 is negative, the program proceeds back to S200.

On the other hand, when the result in S202 is affirmative, the program proceeds to S204, in which the throttle opening command value θth is read while the fuel injection amount is decreased. This is done by decreasing the fuel injection amount by 5% per second, and the throttle opening command value θth regulated with the decreased fuel injection amount is read every 100 milliseconds to calculate an average of the throttle opening command values θth for 1 second. The decreased fuel injection amounts (thus injected) and the averages of the throttle opening command values θth are sequentially stored in the memory.

The program then proceeds to S206, in which it is determined whether the throttle opening command value θth is increased by a prescribed value or more, i.e., whether the throttle opening command value θth (average) since the fuel injection amount decrease is increased by 5% or more compared to that before the fuel injection amount decrease. It corresponds to determining whether the value θth has reached a point b in FIG. 8. When the result is negative, the program proceeds back to S204.

Figure 9:
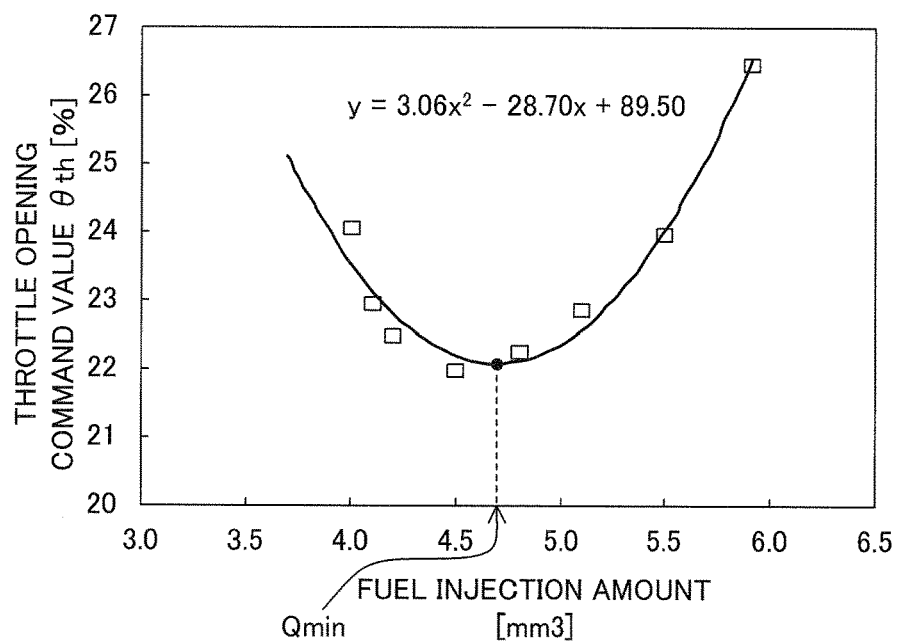
FIG. 9 is a graph for explaining a fuel injection amount (Qmin) corresponding to the output air/fuel ratio of the FIG. 7 flowchart.

When the result in S206 is affirmative, the program proceeds to S208, in which a fuel injection amount Qmin corresponding to the output air/fuel ratio is calculated. To be precise, as shown in FIG. 9, the increased/decreased injection amount of injected fuel and the throttle opening command value θth (average) at the time of the fuel injection are plotted.

Next, the characteristics of the change of the throttle opening command value θth are approximated as a quadratic curve with the least squares method. Then, the minimum value of the throttle opening command value θth in the approximated quadratic curve is determined and the fuel injection amount Qmin corresponding to the minimum value of the value θth is calculated. This fuel injection amount corresponding to the minimum value of the value θth is the aforesaid fuel injection amount Qmin corresponding to the output air/fuel ratio.

Returning to the explanation on the FIG. 6 flowchart, the program proceeds to S112, in which the feedback correction coefficient K is calculated. As shown in the drawing, the coefficient K is calculated based on a ratio of the fuel injection amount Qmap calculated in S108 to the aforesaid fuel injection amount Qmin corresponding to the output air/fuel ratio calculated in S208.

In other words, the coefficient K represents a degree of deviation between the fuel injection amount under the ideal condition (i.e., the condition when the fuel injection amount maps are prepared) and the fuel injection amount corresponding to the output air/fuel ratio in an actual condition where the engine 12 is operated.

Returning to the explanation on the FIG. 5 flowchart, the program proceeds to S24, in which the fuel injection amount map is corrected or rebuilt, i.e., the mapped values are corrected by multiplying by the coefficient K calculated in S112 (or the fuel injection amount retrieved from the map is simply corrected by the coefficient K).

The program proceeds to S26, in which the indicator 52 is turned on. The indicator 52 is turned on for informing the operator of the fact that the fuel injection amount (map) is thus corrected appropriately by the feedback correction using the output air/fuel ratio estimation.

The program proceeds to S28, in which the coefficient K calculated in S112 is stored in the memory. The stored coefficient K will be used for correcting or rebuilding the fuel injection amount (map) at the next engine start as mentioned in S14.

Then the program proceeds to S30, in which the alcohol rate estimation and fuel injection amount map forcible switching is conducted.

Figure 10:
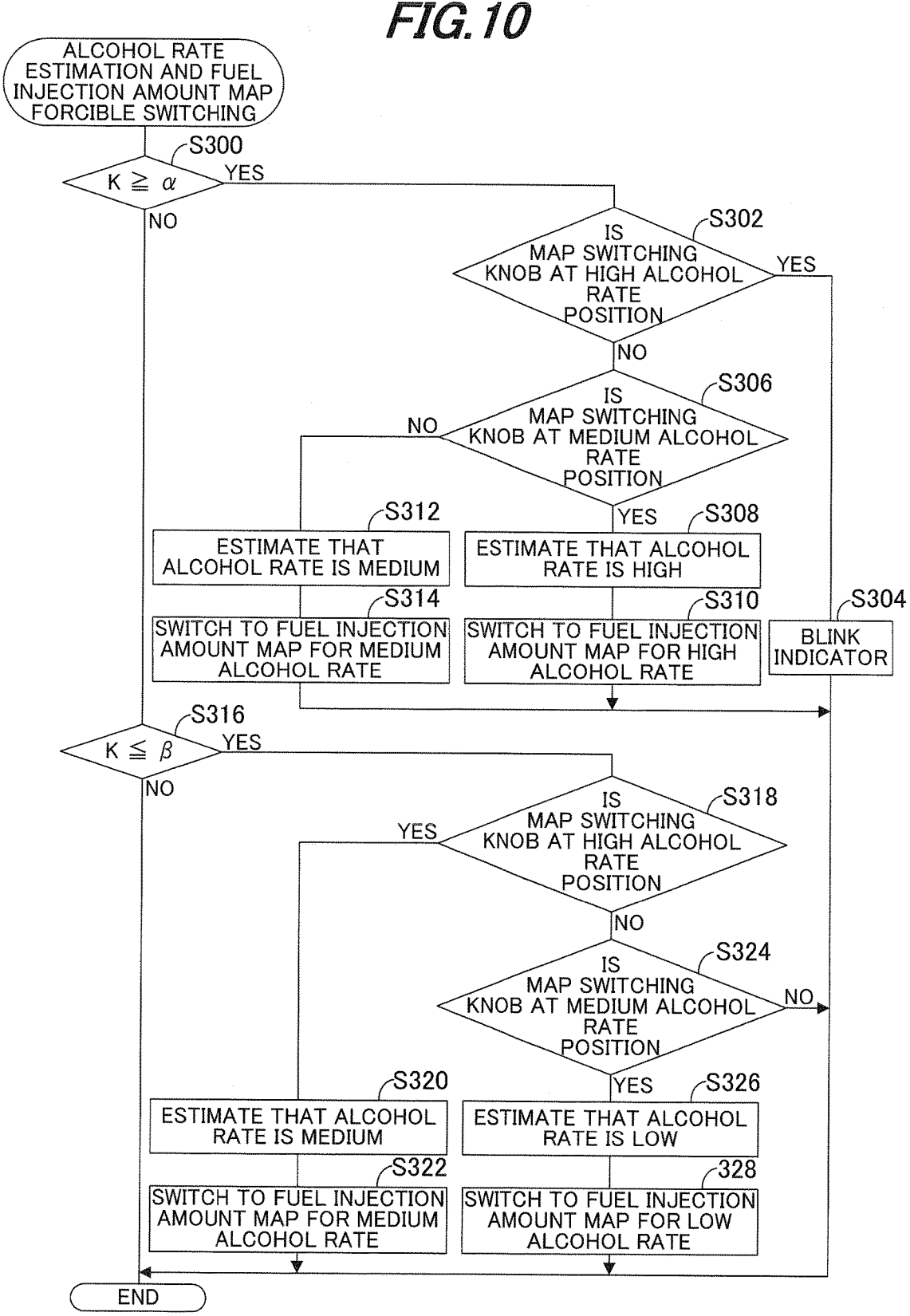
FIG. 10 is a subroutine flowchart showing estimation of alcohol rate and forcible switching of fuel injection amount map in response thereto referred to in the FIG. 5 flowchart.

FIG. 10 is a subroutine flowchart showing the process.

The program begins in S300, in which it is determined whether the feedback correction coefficient K is equal to or greater than a predetermined value α. The predetermined value α is set to a value greater than 1.0, e.g., 1.2.

When the result in S300 is affirmative, the program proceeds to S302, in which it is determined whether the map switching knob 50 is at a position of the high alcohol rate.

When the result in S302 is affirmative, the program proceeds to S304, in which the indicator 52 is blinked. That is, the affirmative result in S302 means that the coefficient K calculated for the fuel injection amount map corresponding to the high alcohol rate is equal to or greater than 1.2 and in this case, it is estimated that the alcohol rate of the mixed fuel is very high (i.e., 90% or more). In response to this estimation, the indicator 52 is blinked to prompt the operator to feed gasoline.

When the result in S302 is negative, the program proceeds to S306, in which it is determined whether the map switching knob 50 is at a position of the medium alcohol rate.

When the result in S306 is affirmative, the program proceeds to S308, in which it is estimated that the alcohol rate of the mixed fuel is high. The reason is that, since the affirmative result in S306 means that the coefficient K calculated for the fuel injection amount map corresponding to the medium alcohol rate is equal to or greater than 1.2, the alcohol rate is estimated to be higher than the medium alcohol rate (i.e., to be 75% or thereabout). Consequently, the program proceeds to S310, in which the fuel injection amount map is forcibly switched to that for the high alcohol rate.

When the result in S306 is negative, the program proceeds to S312, in which it is estimated that the alcohol rate of the mixed fuel is about the medium level. This is because, since the negative result in S306 means that the coefficient K calculated for the fuel injection amount map corresponding to the low alcohol rate is equal to or greater than 1.2, the alcohol rate is estimated to be the medium alcohol rate slightly higher than the low alcohol rate (i.e., to be 50% or thereabout). Consequently, the program proceeds to S314, in which the fuel injection amount map is forcibly switched to that for the medium alcohol rate.

When the result in S300 is negative, the program proceeds to S316, in which it is determined whether the coefficient K is equal to or less than a predetermined value β. The predetermined value β is set to a value smaller than 1.0, e.g., 0.8.

When the result in S316 is affirmative, the program proceeds to S318, in which it is determined whether the map switching knob 50 is at a position of the high alcohol rate.

When the result in S318 is affirmative, the program proceeds to S320, in which it is estimated that the alcohol rate of the mixed fuel is about the medium level. Specifically, since the affirmative result in S318 means that the coefficient K calculated for the fuel injection amount map corresponding to the high alcohol rate is equal to or less than 0.8, the alcohol rate is estimated to be the medium alcohol rate slightly lower than the high alcohol rate (i.e., to be 50% or thereabout). Consequently, the program proceeds to S322, in which the fuel injection amount map is forcibly switched to that for the medium alcohol rate.

When the result in S318 is negative, the program proceeds to S324, in which it is determined whether the map switching knob 50 is at a position of the medium alcohol rate.

When the result in S324 is affirmative, the program proceeds to S326, in which it is estimated that the alcohol rate of the mixed fuel is low. Explaining this, since the affirmative result in S324 means that the coefficient K calculated for the fuel injection amount map corresponding to the medium alcohol rate is equal to or less than 0.8, the alcohol rate is estimated to be lower than the medium alcohol rate (i.e., to be 25% or thereabout). Accordingly, the program proceeds to S328, in which the fuel injection amount map is forcibly switched to that for the low alcohol rate.

When the result in S316 or S324 is negative, the program is terminated without forcibly switching the fuel injection amount map.

As mentioned in the foregoing, the apparatus according to the first embodiment is configured to provide the map switching knob 50 enabled to be manipulatable by the operator to change one from among of the fuel injection amount maps to another. With this, since the operator roughly assumes the alcohol rate of the mixed fuel stored in the fuel tank and then selects the appropriate one from among three fuel injection amount maps (three sets of characteristics) by manipulating the map switching knob 50, it becomes possible to start the engine 12 with the mixed fuel of any alcohol rate.

Figure 11:
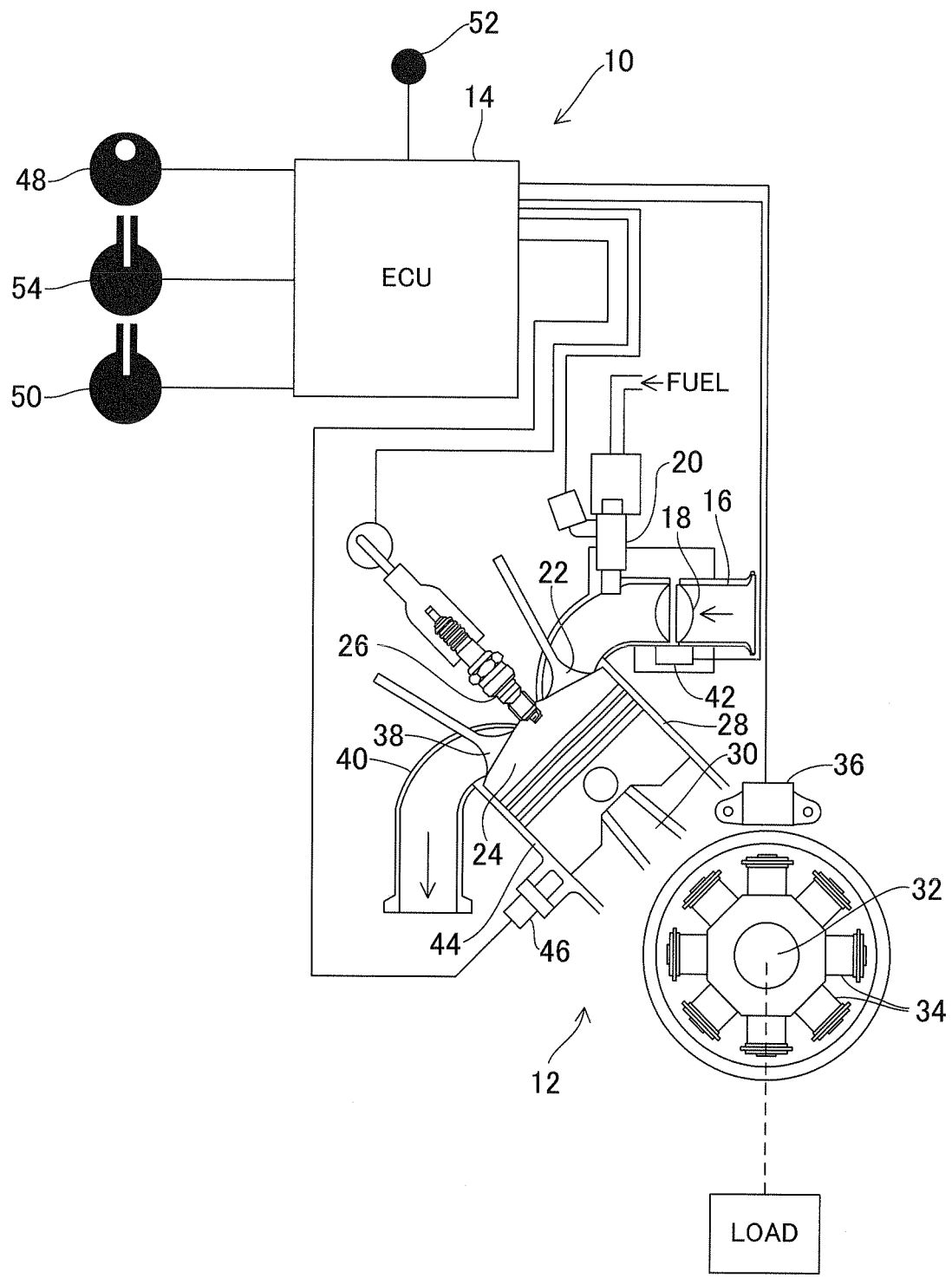
FIG. 11 is an overall schematic view similar to FIG. 1, but showing an air/fuel ratio control apparatus for a general-purpose engine according to a second embodiment of this invention.

FIG. 11 is an overall schematic view similar to FIG. 1, but showing an air/fuel ratio control apparatus for a general-purpose engine according to a second embodiment of this invention.

Compared to the first embodiment, in the second embodiment, more number of fuel injection amount maps are prepared for, in addition to the alcohol rate of the mixed fuel, a temperature (i.e., air temperature) and altitude of a place where the engine 12 is situated and, in order to switch one from among the fuel injection amount maps, a mode selecting knob (switch) 54 is added and the map switching knob 50 is modified.

Figure 12:
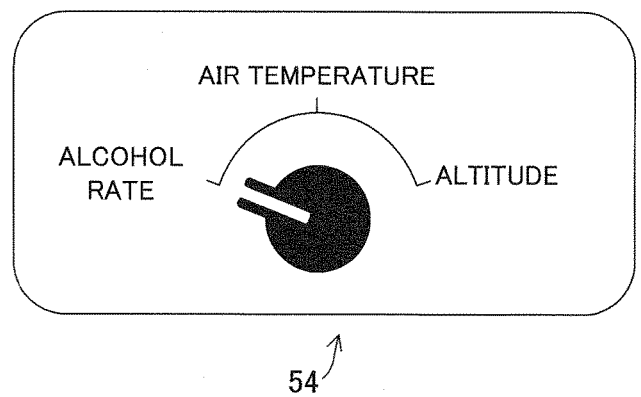
FIG. 12 is a view showing details of a mode selecting knob shown in FIG. 11.
Figure 13:
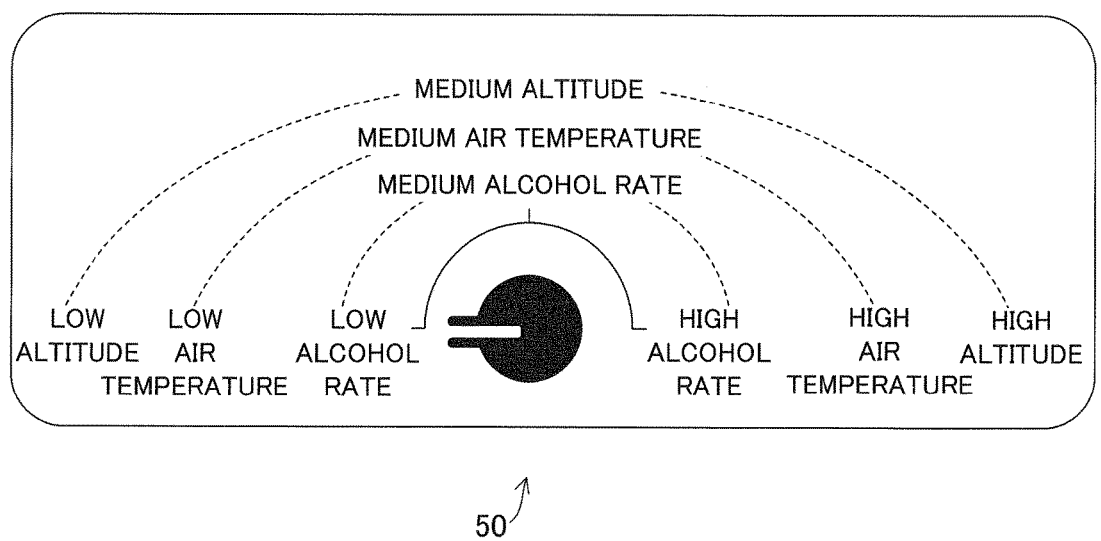
FIG. 13 is a view showing details of a map switching knob shown in FIG. 11.

FIG. 12 is a view showing details of the mode selecting knob 54 and FIG. 13 is a view showing details of the map switching knob 50.

The mode selecting knob 54 is made turnable to switch the mode to select one from among an alcohol rate mode, air temperature mode and altitude mode. The mode selecting knob 54 is installed also to be manipulated by the operator.

The map switching knob 50 is enabled to designate any of three positions as explained in the first embodiment and, in addition to the terms of the alcohol rate, terms of the air temperature and altitude are added.

For example, under the condition where the air temperature mode is designated by the mode selecting knob 54, when the map switching knob 50 is switched to one of three positions, a fuel injection amount map (characteristics) for high, medium or low air temperature corresponding to the one position is selected.

Under the condition where the altitude mode is designated by the mode selecting knob 54, when the map switching knob 50 is switched to one of three positions, a fuel injection amount map (characteristics) for high, medium or low altitude corresponding to the one position is selected.

Thus, the apparatus according to the second embodiment is configured to provide a plurality of the fuel injection amount maps (sets of characteristics) for the alcohol rate, air temperature and altitude, and installed with the mode selecting knob 54 (used to switch one from among the fuel injection amount map to another) and map switching knob 50 enabled to be manipulatable by the operator. With this, it becomes possible to select the appropriate one from among fuel injection maps (characteristics) in accordance with not only the alcohol rate but also the environment such as the air temperature and altitude. The rest of the configuration and effects is the same as the first embodiment As stated above, the first and second embodiments are configured to have an apparatus (10) and a method for controlling an air/fuel ratio of a general-purpose internal combustion engine (12) that is connectable to a load, having a desired engine speed input switch (knob 48) adapted for an operator to input a desired speed of the engine (Nd), an engine speed detector (ECU 14) that detects a speed of the engine (NE), a throttle opening regulator (ECU 14; governor control block) that regulates an opening (θth) of a throttle valve (18) installed in an air intake pipe (16) of the engine such that the detected engine speed (NE) converges to the inputted desired engine speed (Nd), a fuel injection amount calculator (ECU 14) that calculates a fuel injection amount (Qmap) of the engine based on the detected engine speed (NE) and the regulated throttle opening (θth) in accordance with one from among sets of fuel injection amount characteristics, and an injector (20) that injects fuel based on the calculated fuel injection amount, characterized by: a switch (map switching knob 50, mode selecting knob 54) enabled to be manipulated by the operator to switch the sets of the fuel injection amount characteristics from the one to another.

Since the appropriate one from among the fuel injection amount characteristics (maps) is selected through the switch 50, it becomes possible to select an appropriate one from among sets of fuel injection amount characteristics (maps) such that the engine 12 can be properly started in various environment. In addition, since two kinds of switches 50, 54 are installed, it becomes possible to select an appropriate one from among sets of fuel injection amount characteristics (maps) such that the engine 12 can be more properly started in various environments where the engine is situated at the engine start.

The apparatus and method further include: a load determiner (ECU 14, S22, S102, S104) that determines whether the load connected to the engine is kept constant; a fuel injection amount injecting increasing/decreasing unit (ECU 14, S22, S110, S200-S204) that increases/decreases the calculated fuel injection amount (Qmap) to be injected when the load connected to the engine is determined to be kept constant; an air/fuel ratio estimator (ECU 14, S22, S110, S208) that estimates an (output) air/fuel ratio (Qmin) at which an output of the engine becomes maximum based on the throttle opening regulated when the fuel injection amount is fuel of the increased/decreased; and a fuel injection amount corrector (ECU 14, S24) that corrects the fuel injection amount based on the estimated air/fuel ratio.

Specifically, in the engine control apparatus 10 having the governor control block (throttle opening regulator) which controls the throttle opening such that the engine speed converges to the desired engine speed, it is configured to intentionally increase/decrease the fuel injection amount calculated in accordance with the fuel injection amount characteristics (set beforehand) under the condition where the engine load is kept constant, whereby the engine output, i.e., the engine speed is changed. Based on the throttle opening which is also changed accordingly, the output air/fuel ratio is estimated and the air/fuel ratio used to correct the above fuel injection amount.

With this, it becomes possible to, without using an expensive air/fuel ratio sensor such as the wide-range air/fuel ratio sensor, feedback-control the fuel injection amount such that the engine is operated at the output air/fuel ratio.

In the apparatus and method, the air/fuel ratio estimator determines a minimum value of the throttle opening regulated when the fuel injection amount is increased/decreased and estimates the (output) air/fuel ratio based on the determined minimum value (ECU 14, S22, S110, S208). With this, it becomes possible to appropriately estimate the output air/fuel ratio with simple structure.

In the apparatus and method, the fuel injection amount corrector calculates a correction coefficient (K) based on a ratio of the calculated fuel injection amount (Qmap) to a fuel injection amount (Qmin) at which the throttle opening is minimum and corrects the fuel injection amount by the coefficient (ECU 14, S24). With this, it becomes possible to feedback-correct the fuel injection amount without an expensive air/fuel ratio sensor such as the $O_2$ sensor and wide-range air/fuel ratio sensor.

The apparatus and method further include: an informing device (LED 52, ECU 14, S26) that informs an operator of a fact that the fuel injection amount is corrected. With this, it becomes possible to inform the operator that the engine is operated appropriately at the output air/fuel ratio.

The apparatus and method further include: a correction coefficient storing unit (ECU 14, S28) that stores the correction coefficient when the fuel injection amount is corrected by the coefficient.

With this, at the next engine start, since the fuel injection amount is corrected or is calculated in accordance with the fuel injection amount characteristics corrected or rebuilt with the stored correction coefficient, the engine can be appropriately started.

In the apparatus and method, the load determiner determines that the load connected to the engine is kept constant when the detected engine speed is within a predetermined range set based on the desired engine speed continuously for a predetermined time period (ECU 14, S22, S102). With this, it becomes possible to appropriately determine that the engine load is kept constant, with simple structure.

In the apparatus and method, the load determiner determines that the load connected to the engine is kept constant when the regulated throttle opening is equal to or less than a predetermined opening and a change amount of the regulated throttle opening is within a predetermined change amount continuously for a predetermined time period (ECU 14, S22, S104).

Specifically, when the engine is operated at the idling speed continuously for a predetermined time period, it is determined that the engine load is kept constant. With this, it becomes possible to appropriately determine that the engine load is kept constant, with simple structure.

In the apparatus and method, the fuel is mixed fuel containing alcohol and gasoline. With this, when the output air/fuel ratio changes depending on a mixture rate of alcohol to gasoline, since the output air/fuel ratio can be accurately estimated, the engine can be appropriately operated at the output air/fuel ratio regardless of the mixture rate.

In the apparatus and method, the load comprises at least one of a generator, a lawnmower and a snowplow, and the informing device comprises at least one of a lamp (52) and a buzzer.

It should be noted that, although, in response to the affirmative results in both S102 and S104, the engine load is determined to be kept constant, the determination may be made when the result of either S102 or S104 is affirmative.

It should also be noted that, although the map switching knob 50 has the three positions to be designated, the number may be increased depending on the number of the fuel injection amount maps. Also, the knob 50 may be configured to be continuously changed and in this case, the fuel injection amount between adjacent maps is compensated.

It should further be noted that, in place of the installment of the mode selecting knob 54, a map switching knob for each of the alcohol rate, air temperature and altitude modes may be installed.

It should further be noted that, although the alcohol rate is estimated based on the feedback correction coefficient for switching the fuel injection amount map, the air temperature or altitude may instead be estimated so that the fuel injection amount map is switched based on the estimation.

It should further be noted that, although the operator is informed visually by lighting the indicator 52 or the like, an audible device such as a buzzer could instead be used.

Japanese Patent Application No. 2010-029034 filed on Feb. 12, 2010, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling an air/fuel ratio of a general-purpose internal combustion engine that is connectable to a load, wherein a mixed fuel containing alcohol and gasoline and stored in a fuel tank is used for the engine, the apparatus comprising:

a desired engine speed input switch adapted for an operator to input a desired speed of the engine;

an engine speed detector that detects a speed of the engine;

a throttle opening regulator that regulates an opening of a throttle valve installed in an air intake pipe of the engine such that the detected engine speed converges to the inputted desired engine speed;

a switching member enabled to be manipulated by the operator and having a plurality of selectable positions corresponding to respective rates of alcohol contained in the mixed fuel, the switching member being switched to a position corresponding to an alcohol rate of the mixed fuel stored in the fuel tank and estimated by the operator to specify the alcohol rate of the mixed fuel stored in the fuel tank according to the switched position of the switching member;

a fuel injection amount calculator that selects one from among a plurality of fuel injection amount maps prepared beforehand according to the alcohol rates of the mixed fuels in response to the switched position of the switching member and calculates a fuel injection amount of the engine based on the detected engine speed and the regulated throttle opening in accordance with the selected fuel injection amount map;

an injector that injects the mixed fuel based on the calculated fuel injection amount;

a temperature sensor that detects an engine temperature of the engine;

a load determiner that determines whether the load connected to the engine is kept constant;

a fuel injection amount injecting increasing or decreasing unit that increases or decreases the fuel injection amount calculated by the fuel injection amount calculator when the load connected to the engine is determined to be kept constant;

an air/fuel ratio estimator that determines a minimum value of the throttle opening based on the throttle opening regulated when the fuel injection amount is increased and decreased by the fuel injection amount injecting increasing or decreasing unit and that estimates an air/fuel ratio at which an output of the engine becomes maximum based on the determined minimum value of the throttle opening; and a fuel injection amount corrector that corrects the fuel injection amount calculated by the fuel injection amount calculator based on the engine temperature detected by the temperature sensor and the air/fuel ratio estimated by the air/fuel ratio estimator, wherein the fuel injection amount corrector calculates a correction coefficient based on a ratio of the fuel injection amount calculated in accordance with the selected fuel injection amount map to a fuel injection amount at which the throttle opening is minimum and the output of the engine becomes maximum, and corrects the selected fuel injection amount map by the coefficient.

2. The apparatus according to claim 1, wherein the air/fuel ratio estimator determines a minimum value of the throttle opening regulated when the fuel injection amount is increased or decreased and estimates the air/fuel ratio based on the determined minimum value.

3. The apparatus according to claim 1, further comprising:
an informing device that informs an operator of a fact that the fuel injection amount is corrected.

4. The apparatus according to claim 1, further comprising:
a correction coefficient storing unit that stores the correction coefficient when the fuel injection amount is corrected by the coefficient.

5. The apparatus according to claim 1, wherein the load determiner determines that the load connected to the engine is kept constant when the detected engine speed is within a predetermined range set based on the desired engine speed continuously for a predetermined time period.

6. The apparatus according to claim 1, wherein the load determiner determines that the load connected to the engine is kept constant when the regulated throttle opening is equal to or less than a predetermined opening and a change amount of the regulated throttle opening is within a predetermined change amount continuously for a predetermined time period.

7. The apparatus according to claim 1, wherein the load comprises at least one of a generator, a lawnmower and a snowplow.

8. The apparatus according to claim 3, wherein the informing device comprises at least one of a lamp and a buzzer.

9. The apparatus according to claim 1, further comprising an alcohol rate estimator that estimates the alcohol rate of the mixed fuel stored in the fuel tank based on the switched position of the switching member and the coefficient calculated by the fuel injection amount corrector.

10. The apparatus according to claim 9, wherein the fuel injection amount corrector switches the selected fuel injection amount map to another fuel injection amount map among the plurality of fuel injection amount maps in response to the alcohol rate estimated by the alcohol rate estimator.

11. A method for controlling an air/fuel ratio of a general-purpose internal combustion engine that is connectable to a load, wherein a mixed fuel containing alcohol and gasoline and stored in a fuel tank is used for the engine, the method comprising:

inputting a desired speed of the engine with a desired engine speed input switch adapted for an operator to input the desired speed of the engine;

detecting a speed of the engine with an engine speed detector that detects a speed of the engine;

regulating a throttle opening with a throttle opening regulator that regulates the opening of a throttle valve installed in an air intake pipe of the engine such that the detected engine speed converges to the inputted desired engine speed;

selecting a fuel injection amount map with a fuel injection amount calculator that selects one from among a plurality of fuel injection amount maps prepared beforehand according to alcohol rates of the mixed fuel, in response to a switched position of a switching member enabled to be manipulated by the operator, the switching member having a plurality of selectable positions corresponding to respective rates of alcohol contained in the mixed fuel, the switching member being switched to a position corresponding to an alcohol rate of the mixed fuel stored in the fuel tank and estimated by the operator to specify the alcohol rate of the mixed fuel stored in the fuel tank according to the switched position of the switching member;

calculating a fuel injection amount with the fuel injection amount calculator that calculates the fuel injection amount of the engine based on the detected engine speed and the regulated throttle opening in accordance with the selected fuel injection amount map;

injecting fuel with an injector that injects the fuel based on the calculated fuel injection amount;

detecting an engine temperature of the engine;

determining whether the load connected to the engine is kept constant;

increasing or decreasing the calculated fuel injection amount to be injected when the load connected to the engine is determined to be kept constant;

determining a minimum value of the throttle opening based on the throttle opening regulated when the fuel injection amount is increased and decreased and estimating an air/fuel ratio at which an output of the engine becomes maximum based on the determined minimum value of the throttle opening; and correcting the fuel injection amount based on the detected engine temperature and the estimated air/fuel ratio, wherein the step of fuel injection amount correcting calculates a correction coefficient based on a ratio of the calculated fuel injection amount to a fuel injection amount at which the throttle opening is minimum and the output of the engine becomes maximum and corrects the fuel injection amount map by the coefficient.

12. The method according to claim 11, wherein the step of air/fuel ratio estimating determines a minimum value of the throttle opening regulated when the fuel injection amount is increased or decreased and estimates the air/fuel ratio based on the determined minimum value.

13. The method according to claim 11, further comprising the step of:
informing an operator of a fact that the fuel injection amount is corrected.

14. The method according to claim 11, further comprising the step of:
storing the correction coefficient when the fuel injection amount is corrected by the coefficient.

15. The method according to claim 11, wherein the step of load determining determines that the load connected to the engine is kept constant when the detected engine speed is within a predetermined range set based on the desired engine speed continuously for a predetermined time period.

16. The method according to claim 11, wherein the step of load determining determines that the load connected to the engine is kept constant when the regulated throttle opening is equal to or less than a predetermined opening and a change amount of the regulated throttle opening is within a predetermined change amount continuously for a predetermined time period.

17. The method according to claim 11, wherein the load comprises at least one of a generator, a lawnmower and a snowplow.

18. The method according to claim 13, wherein the step of informing is made using at least one of a lamp and a buzzer.

19. The method according to claim 11, further comprising the step of:
estimating the alcohol rate of the mixed fuel stored in the fuel tank based on the switched position of the switching member and the calculated coefficient.

20. The method according to claim 19, wherein the step of fuel injection amount correcting switches the selected fuel injection amount map to another fuel injection amount map among the plurality of fuel injection amount maps in response to the estimated alcohol rate.

* * * * *